United States Patent [19]

Payne

[11] Patent Number: 4,786,909
[45] Date of Patent: Nov. 22, 1988

[54] RECEIVING CIRCUIT

[75] Inventor: Alan N. Payne, Wedmore, England

[73] Assignee: EMI Limited, Haynes, England

[21] Appl. No.: 822,214

[22] Filed: Jan. 24, 1986

[30] Foreign Application Priority Data

Feb. 1, 1985 [GB] United Kingdom ............ 8502547

[51] Int. Cl.$^4$ .............................................. G01S 13/00
[52] U.S. Cl. ...................................... 342/94; 342/159; 342/203
[58] Field of Search ............... 342/13, 203, 192, 417, 342/94, 159, 162

[56] References Cited

U.S. PATENT DOCUMENTS

| | | | |
|---|---|---|---|
| 3,686,670 | 8/1972 | Callendar et al. ............... | 342/417 |
| 4,008,472 | 2/1977 | Nirasawa et al. ............... | 342/159 |
| 4,176,357 | 11/1979 | Fales ............................... | 342/13 |
| 4,459,592 | 7/1984 | Long ............................... | 342/94 |
| 4,529,985 | 7/1985 | Sawyer et al. .................. | 342/94 |
| 4,630,052 | 12/1986 | Galati et al. ..................... | 342/159 |
| 4,638,319 | 1/1987 | Chua ............................... | 342/417 |
| 4,673,942 | 6/1987 | Yokoyama ...................... | 342/368 |

*Primary Examiner*—Theodore M. Blum
*Attorney, Agent, or Firm*—Fleit, Jacobson, Cohn & Price

[57] ABSTRACT

In a receiving circuit a control circuit and a direction finding circuit generate a digitally encoded "descriptor" which characterizes pulses of r.f. radiation received in a particular azimuthal direction and having a particular carrier frequency. The "descriptor" may be compared with data stored in a processing circuit representing r.f. pulses emitted by sources which have already been detected or which are known to exist. To reduce the workload on processing circuit a number of emulator circuits generate pulse patterns which simulate pulses produced by known sources of little inherent interest. If the received pulses match the simulated pulses a gate inhibits control circuit.

11 Claims, 2 Drawing Sheets

4,786,909

RECEIVING CIRCUIT

This invention relates to a receiving circuit.

In a modern electronic warfare environment the number and sophistication of emitter systems has increased significantly. A receiver, therefore, should be capable of operating in a dense signal environment so as to allow processing of selected, relevant signals with optimum efficiency. The receiver, ideally should be capable of discriminating between signals within a wide band of frequencies (e.g. 0.5–18 GHz) and having different pulse formats.

Accordingly, there is provided a receiving circuit comprising an antenna arrangement for receiving pulses of microwave radiation from one or a number of sources and for producing electrical signals indicative of received pulses, a first processing circuit for operating on said electrical signals, indicative of received pulses, to generate a succession of electrical data signals representing successively received pulses of microwave radiation having a selectable carrier frequency, a second processing circuit capable of responding to operation of said first processing circuit to generate a plurality of coded data messages which are at least indicative of the relative timings of a corresponding plurality of said successively generated electrical data signals, a circuit for comparing the electrical data signals so generated with a succession of reference signals, and means for inhibiting generation of a said coded data message whenever the compared signals have a predetermined temporal relationship.

In order that the invention may be readily carried into effect and embodiment thereof is now described, by way of example only, by reference to the accomanying drawings of which:

Figure 1:
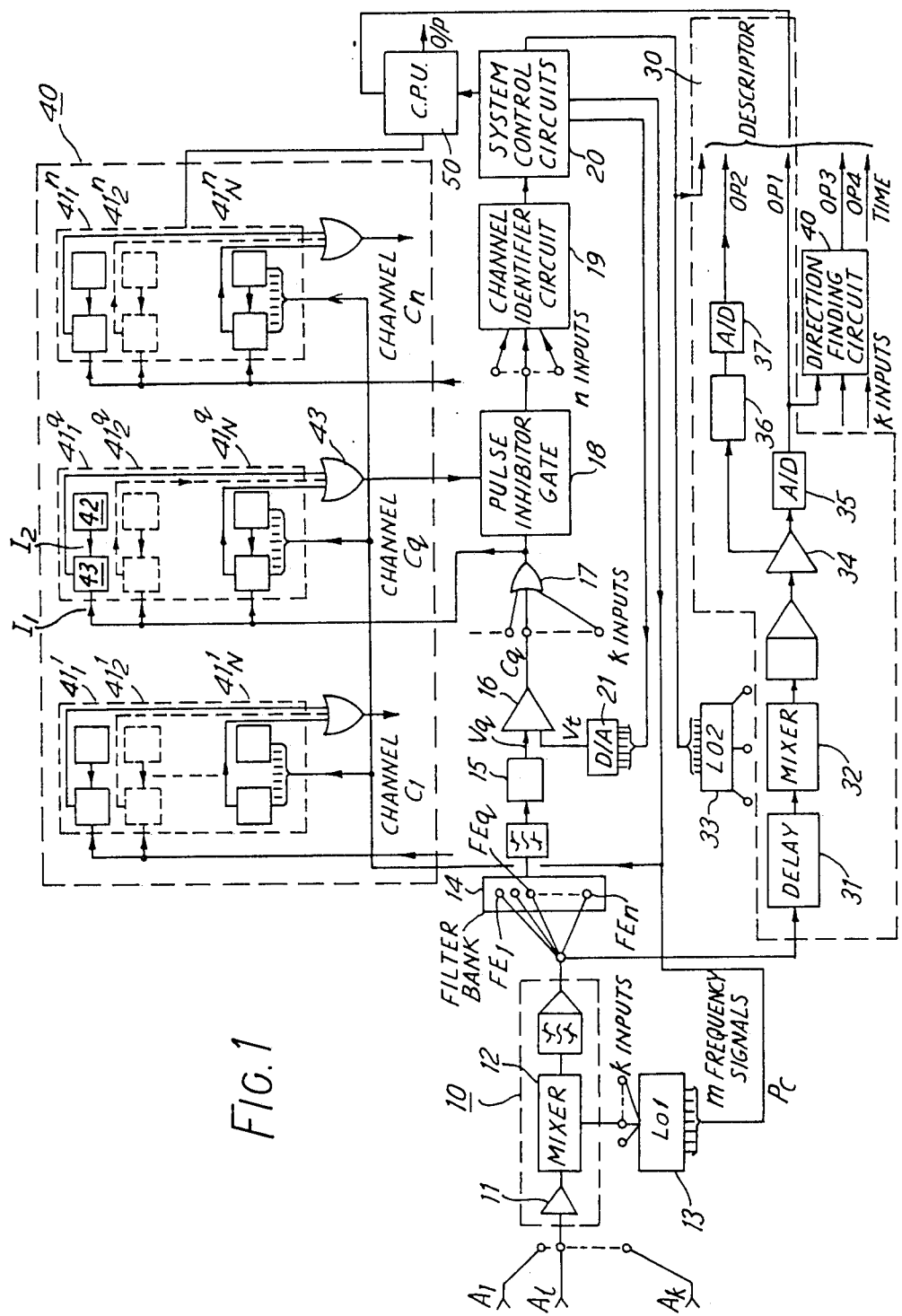
FIG. 1 illustrates the receiving circuit in block schematic form.

Referring now to FIG. 1, the receiver includes k antennas ($A_1 \ldots A_k$) having response beams which point in respective azimuthal directions. The response beams of adjacent elements overlap one another to provide, in effect, a substantially uniform coverage extending over 360° in azimuth.

Each antenna is provided with a respective processing circuit. For reasons of clarity, only one such circuit, associated with antenna $A_1$, is shown in the Figure, the other processing circuits being identical.

Electrical pulses produced at the output of antenna $A_1$, and indicative of pulses of radiation received in the corresponding azimuthal sector, are subjected initially to frequency analysis in a first part 10 of the processing circuit. After amplification at 11 a received r.f. signal is combined in a mixer 12 with a local oscillator (LO1) signal generated in a stabilised oscillator 13 thereby to produce a suitable intermediate frequency (i.f.) signal. In an electronic-warfare environment the frequency of received radiation may lie, typically, within a frequency band which is considerably wider than the i.f. passband of the mixer. In this example, therefore, the local oscillator 13 is arranged to generate a plurality m of different LO signals spaced apart in frequency by an amount which is slightly less than the width of the i.f. passband. An electrical signal corresponding to a pulse of received r.f. radiation may be mixed at 12 with each LO signal, in turn, to effectively scan the i.f. passband of the mixer across a much wider frequency band consistent with the expected frequency band of received r.f. radiation. A control circuit 20 is used to deliver control pulses $P_c$ to the oscillator to cause switching between the different LO signals.

An i.f. signal produced at the output of the mixer is subjected to frequency partitioning in a filter bank 14 consisting of a plurality of n discrete bandpass filter elements $FE_1 \ldots FE_n$. The filter elements are arranged in parallel to define respective frequency channels having overlapping, or alternatively contiguous passbands of substantially equal width. Again, for reasons of clarity, only one such channel $C_q$ is shown in FIG. 1.

An i.f. pulse which passes a filter element ($FE_q$) is demodulated in a respective envelope detector 15 and the magnitude of the resulting envelope signal $V_q$ is compared in a comparator 16 with a threshold voltage $V_t$ chosen to be commensurate with a valid detection. The threshold voltage $V_t$ may be adapted under the control of circuit 20, in accordance with prevailing conditions, by way of D/A converter 21.

If a detection is made the output of comparator 16 goes high and a binary "1" is delivered, via OR gate 17 and a pulse inhibitor circuit 18, to a channel identifier 19. The OR gate 17 is arranged to receive electrical signals from equivalent frequency channels in each of the k azimuthal sectors. In total, n such OR gates are provided, one for each frequency channel (for reasons of clarity only one gate is shown) and channel identifier 19 is coupled to each gate via a respective pulse inhibitor circuit 18 and produces a binary coded signal indicative of the frequency channel within which a detection has occurred. The output of each pulse inhibitor circuit 18 assumes the binary "1" state provided there is a binary "1" input from the associated OR gate 17 and a binary "0" input from an associated emulator circuit $41^q$, the purpose of which will become apparent hereinafter. As will be explained, in some operational circumstances this condition may not prevail; further processing of a detected signal will then be inhibited.

Control circuit 20 responds to a received binary coded signal by triggering a second part of the processing circuit, shown generally at 30. Again k such circuits 30 are provided, although for clarity only one is shown in detail. Each circuit 30, together with a common direction finding circuit 40, is capable of producing a coded data message, hereinafter referred to as a "descriptor", which characterises a pulse of radiation detected in the respective azimuthal sector. An i.f. output signal from circuit 10, described hereinbefore, is fed via a suitable delay line 31, in circuit 30, to a further mixer 32 wherein it is combined with a local oscillator circuit 33. The frequency of the signal generated by circuit 33 is selected by control circuit 20 so that the mixer 32 changes the signal frequency to a second i.f. centred on the frequency band of the appropriate one of channels $C_1 \ldots C_n$ within which a detection was made. After logarithmic detection and amplification at 34 the resulting envelope is digitised in an analogue-to-digital conversion circuit 35 thereby to produce a digital output signal $OP_1$ representing the amplitude of the detected signal. In addition, the i.f. signal amplified at 34 is passed to a frequency discriminator 36, the output of which is digitised in a further A/D conversion circuit 37, to produce a further digital output signal $OP_2$ representing, with precision, the i.f. frequency which has been measured. The digitised outputs of the logarithmic amplifiers 34 for each of the k azimuthal sectors are fed to a common direction finding circuit 40 arranged to compare the respective powers of the received signals and so generate a digital output signal $OP_3$ representing the azimuthal direction of a detected source. In addition a further signal $OP_4$ represents the timing of the received pulse of radiation.

In this example, output signals $OP_1$, $OP_2$, $OP_3$ and $OP_4$ together with data, generated in control circuit 20, representing the respective frequencies of the local oscillator circuits 13 and 33 form a digitally encoded descriptor which characterises a received pulse of r.f. radiation. The descriptor, generated line this manner, is passed to a central processor unit (CPU) 50 and can then be compared with stored data representing sources of r.f. which have already been detected or which are known to exist.

Under conditions of high radar activity the majority of r.f. sources are probably transmitting signals of a conventional, readily predictable form; such signals would not, in general, exhibit the refinements e.g. pulse compression, pulse/pulse r.f. agility, p.r.f. jitter and other e.c.c.m. features used in more specialised circumstances. Having ascertained the characteristics of the pulses produced by a source, the incidence of further pulses having these characteristics would be entirely predictable and of little inherent interest. In these circumstances, it would be advantageous to relieve the CPU of having to apply its relatively refined correlation and recognition procedures to routine happenings; the CPU may then be used to analyse more thoroughly the characteristics of signals produced by new, previously unknown sources. To this end, an additional circuit, shown generally at 40 is provided. This circuit is used to generate, in respect of each i.f. channel $C_1$, $C_2$ . . . $C_n$ respective pulse patterns simulating the expected form of signals produced at the output of OR gate 17 in respect of each of the r.f. bands under investigation. Circuit 40 comprises n blocks of N emulator circuits $41_1{}^1$ . . . $41_N{}^1$; $41_1{}^2$ . . . $41_N{}^2$; . . . $41_1{}^n$ . . . $41_N{}^n$. Each block corresponds to a respective i.f. channel $C_1$, $C_q$ . . . $C_n$, but for reasons of clarity only one block, corresponding to channel $C_q$ in this case, is shown connected. Each emulator circuit in a block comprises a pulse generator (e.g. 42) arranged to produce a train of pulses at a characteristic rate and a corresponding comparison circuit (e.g. 43), one input ($I_1$) of which is connected to the output of the corresponding OR gate 17 and the other input ($I_2$) of which is connected to the output of the pulse generator. Each block is controlled by the CPU 50 which, in dependence on the r.f. band currently under investigation, selects appropriate one of the emulator circuits to construct a complex waveform simulating the expected timing of the envelope produced at the output of OR gate 17 in the corresponding i.f. channel. Provided the output of an OR gate 43, which is connected to the outputs of all the comparators in the block, remains high, showing that the received envelope signal matches the simulated waveform, the detected source is deemed to be of little inherent interest and the inhibitor gate remains closed. In these circumstances triggering of circuit 30, described hereinbefore, by control unit 20 does not occur and no "descriptor" is produced. If, on the other hand, the OR gate 43 goes low the detected envelope signal differs from the expected signal and the inhibitor gate assumes the open condition. Triggering of circuit 30 can then occur and a descriptor is generated.

Thus, the CPU is only brought into operation when a new, previously "unsimulated" source, is identified. The CPU is arranged to produce an output signal O/P indicating that a new source has been detected. It will be appreciated that the CPU may be preconditioned with data indicative of the expected sources, or alternatively such data may be derived from "descriptors" produced by circuit 30.

When the r.f. local oscillator signal, generated by LO circuit 13 is stepped an element (e.g. FE(1)) of filter bank 14 may receive a signal of commensurate frequency abruptly. An abrupt change may give rise to a broad frequency spectrum resulting in responses in more than one channel.

Accordingly a single r.f. carrier frequency could produce in significant responses in two, or possibly three or four, adjacent frequency channels, although, in general, one of these responses would dominate. However, the sharply rising edge at the time when the signal received is associated with a wide band short term frequency spectrum leading to more nearly equal transient amplitudes in the adjacent channels. This is illustrated by the waveforms shown diagramatically in FIGS. 2a to 2d.

Figure 2:
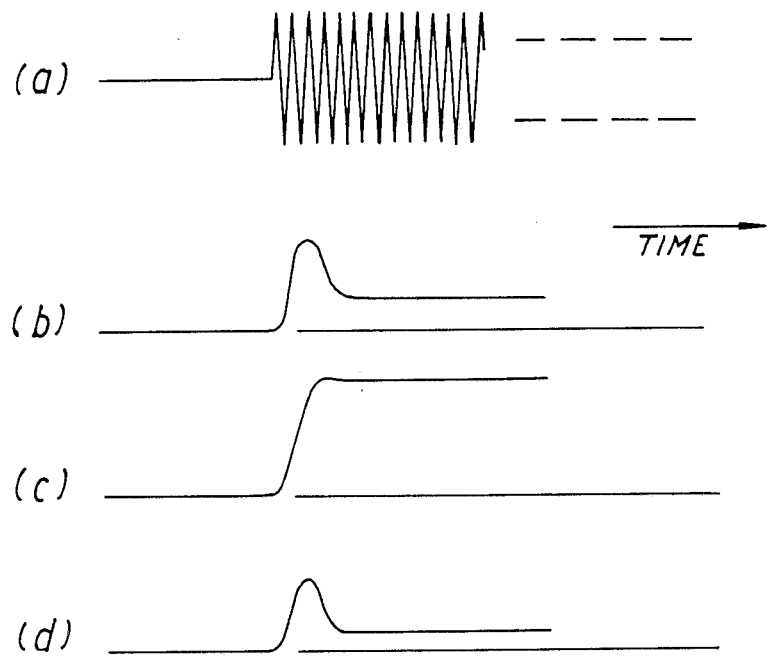
FIGS. 2a to 2d show signals at different parts of the circuit of FIG. 1.

FIG. 2a shows, by way of example, the stepped arrival of a carrier signal and FIGS. 2b, 2c and 2d show the respective responses in channels $C_{n-1}$; $C_n$ and $C_{n+1}$. The carrier frequency of the waveform shown in FIG. 2a falls within the passband of filter FE(n) and hence FIG. 2c shows a substantially monotonic rise its steady value. Both FIGS. 2b and 2d, however, exhibit appreciable overshoot.

Figure 3:
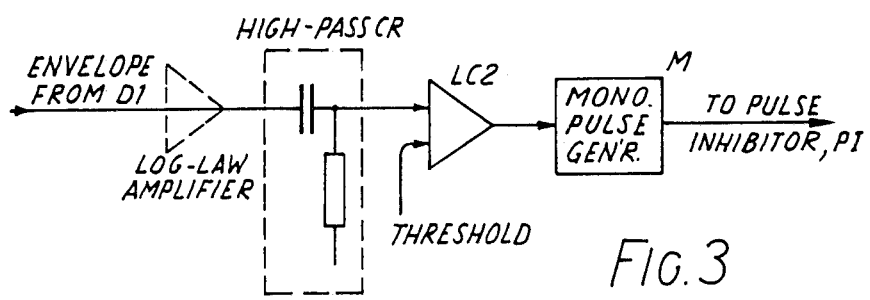
FIG. 3 shows a modification of the circuit of FIG. 1.

In the system shown in FIG. 1, the output amplitude of local oscillator circuit 13 does not change as the frequency is stepped and, since the subsequent i.f. is wideband, the envelope of its output has only a short rise time, corresponding to FIG. 2a. To avoid having to perform amplitude comparisons of the resulting waveforms shown in FIGS. 2b to 2d, it is arranged for the effect shown in FIGS. 2b and 2d to be inhibited. This is done by means of a circuit such as that shown in FIG. 3, in which the output from each envelope detector, 15 is applied, via a short time-constant high-pass section ("differentiator"), CR, to its respective level comparator LC2. A decline in the input after its positive peak results in the output to circuit 16 going negative and, if it exceeds a suitable threshold value, triggers monostable circuit M. The output of the monostable circuit is connected (via an OR gate if necessary) to the input of gate 17.

It will be appreciated that, on occasions when signals are present in adjoining channels at the time when the appropriate frequency segment is selected, the stronger tends to swamp any overshoots in its channel caused by the walker. A very strong signal may, however, generate a sufficient over-shoot to mute the neighbouring channel and, in the process, suppress response to a significant signal which it could be carrying. One way to ameliorate this effect is to precede the section CR of FIG. 3 by a log-law video amplifier (shown dotted). In this case, in the absence of a steady signal, the amplitude of the negative waveform due to a strong signal in the next channel would be adequate to stimulate inhibition. When its is combined with a steady signal, however, its amplitude becomes reduced; if the steady signal is strong enough, the negative-going voltage could be sufficient to exceed the relevant threshold value, and therefore not trigger the monostable.

I claim:

1. A receiving circuit comprising,
    an antenna arrangement for receiving pulses of microwave radiation from one or a number of sources,
    a first processing circuit for generating a succession of electrical data pulses representing successively received pulses of microwave radiation at a selectable carrier frequency,
    a second processing circuit capable of deriving a coded data message from said succession of electrical data pulses, the coded data message being representative of at least the relative timings of the received pulses of microwave radiation at said selectable carrier frequency,
    a comparison circuit including a plurality of pulse generating means each capable of producing a respective train of electrical pulses and means for comparing said succession of electrical data pulses with a reference pulses train comprising pulses generated jointly by selected ones of said pulse generating means,
    and means for inhibiting said second processing circuit whenever the compared pulses have a predetermined temporal relationship.

2. A receiving circuit according to claim 1 which includes a plurality of said comparison circuits each being associated with a different respective selectable carrier frequency.

3. A receiving circuit according to claim 1 or claim 2 wherein a said reference pulse train is related to a said coded data message derived from an earlier succession of electrical data pulses.

4. A receiving circuit according to any one of claims 1 to 3 wherein said antenna arrangement includes a purality of antennas each being arranged to receive pulses of microwave radiation incident in a different respective azimuthal direction, and there is a respective said first processing circuit and a respective said second processing circuit associated with each said antenna.

5. A receiving circuit according to claim 4 wherein each said second processing circuit includes means to generate a respective electrical magnitude signal representing the intensity of radiation, at a selectable carrier frequency, which is incident in the respective azimuthal direction, and a comparator is provided to compare the electrical magnitude signals generated simultaneously by said second processing circuits and for producing a comparison signal representing the azimuthal direction of a source of said incident radiation at said selectable carrier frequency, said comparison signal, representative of azimuthal direction, forming part of the coded data message.

6. A receiving circuit comprising an antenna arrangement for receiving pulses of microwave radiation from one or a number of sources, the antenna arrangement including a plurality of antennas each being arranged to receive pulses of microwave radiation incident in a different respective azimuthal direction, a respective first processing circuit associated with each of said antennas, each first processing circuit being effective to generate a succession of electrical data pulses representing successively received pulses of microwave radiation incident, in the respective azimuthal direction, at a selectable carrier frequency,
    a respective second processing circuit associated with each said first processing circuit, each second processing circuit being capable of deriving a coded data message from a respective succession of electrical data pulses produced by the associated first processing circuit, the coded data message being representative of, at least the relative timings of received pulses of microwave radiation at said selectable carrier frequency, and each said second processing circuit including means to generate a respective magnitude signal representing the intensity of radiation, at said selectable carrier frequency, incident in the respective azimuthal direction,
    means for comparing the electrical magnitude signals generated simultaneously by said second processing circuits and for producing a comparison signal representing the azimuthal direction of a source of said incident radiation at said selectable carrier frequency, said comparison signal, representative of azimuthal direction, forming part of a said coded data message,
    further comparison means for comparing a succession of said electrical data pulses with a succession of reference pulses,
    and means capable of inhibiting one or more said second processing circuit whenever the compared pulses have a predetermined temporal relationship.

7. A receiving circuit according to claim 6 wherein a said succession of reference pulses is related to a said coded data message derived from an earlier succession of electrical data pulses.

8. A receiving circuit according to claim 6 or claim 7 wherein said further comparison circuit includes a plurality of pulses generating means, each capable of producing a respective train of electrical pulses, and means for comparing a succession of said electrical data pulses with a said succession of reference pulses generated jointly by selected one of said pulse generating means.

9. A receiving circuit according to claim 6 wherein there is a plurality of said further comparison circuits each associated with a different respective selectable carrier frequency.

10. A receiving circuit according to claim 7 wherein there is a plurality of said further comparison circuits each associated with a different respective selectable carrier frequency.

11. A receiving circuit according to claim 8 wherein there is a plurality of said further comparison circuits each associated with a different respective selectable carrier frequency.

* * * * *